Sept. 16, 1958 S. RUBEN 2,852,591
POTENTIAL PRODUCING CELL AND BATTERY PILE
Filed Dec. 21, 1954
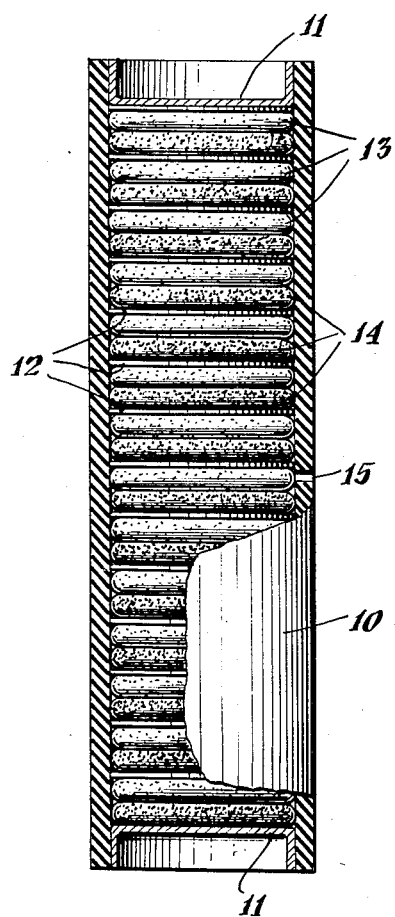
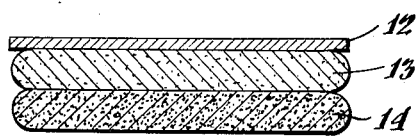
INVENTOR.
Samuel Ruben
BY
ATTORNEY United States Patent Office 2,852,591
Patented Sept. 16, 1958

2,852,591

POTENTIAL PRODUCING CELL AND BATTERY PILE

Samuel Ruben, New Rochelle, N. Y.

Application December 21, 1954, Serial No. 476,645

9 Claims. (Cl. 136—87)

This invention relates to potential producing cells and to high voltage dry batteries constructed with said cells.

It is an object of the invention to improve potential producing cells.

It is another object of the invention to provide a potential producing cell capable of holding its potential over long periods of time.

It is a further object of the invention to provide a dry cell containing no aqueous electrolyte which may be conveniently assembled into a high voltage dry battery operable over wide temperature limits with minimum change in characteristics.

Still another object of the invention is the provision of improved electrodes for use in cells and batteries of the type described.

It is also within the contemplation of the invention to provide a non-aqueous high voltage dry battery which is simple in structure, is characterized by an extremely long useful life and which may be readily manufactured on a quantity production scale at a low cost.

The invention also contemplates a novel method of making a high voltage potential producing dry battery of the described character.

Other and further objects and advantages of the present invention will become apparent from the following description, taken in conjunction with the accompanying drawing, in which:

Fig. 1 is a vertical sectional view, having parts in elevation, of a high voltage dry battery embodying the invention; and Fig. 2 is a sectional view of a single cell forming part of the battery shown in Fig. 1.

The present application is a continuation-in-part of my copending applications Serial No. 402,103, filed January 4, 1954, now Patent No. 2,707,199, granted April 26, 1955, and Serial No. 460,389, filed October 5, 1954, now Patent No. 2,816,151, granted December 10, 1957, respectively.

In my co-pending application Serial No. 402,103, I have disclosed and claimed a potential producing dry cell employing a solid ionic conductor of tin sulfate as the electrolyte. In my co-pending application Serial No. 460,389, I have disclosed and claimed a potential producing dry cell employing a solid ionic conductor of bismuth sulfate or antimony sulfate. Discs compressed from ionically conductive solid sulfates, such as tin, bismuth or antimony sulfate, are electrically conductive and, when placed in contact with dissimilar materials, they will generate a potential depending on the electrochemical difference in the materials, and will maintain their potential under various conditions of shelf life. Thus, there is provided a cell capable of holding a constant potential at open circuit condition and one suitable for applications where only extremely low currents are required. Tin sulfate, bismuth sulfate and antimony sulfate, being solid and ionically conductive, do not depend upon, nor do they require, the addition of any moisture, humectants, or other similar agents. It will be noted that the positive ion of the sulfate salts of the type described is one having a lower electrochemical deposition voltage than hydrogen, thereby avoiding cathode polarization or hydrogen generation on flow of current.

I have found that potential producing cells of the described character can be further considerably improved by employing a suitable permanganate, such as barium, potassium, lithium or silver permanganate as the positive or depolarizer electrode, barium permanganate being the preferred material. Since these permanganates are of a negligible electrical conductivity, it is desirable to add a smaller amount of finely divided inert material, such as graphite, to the permanganates. Preferably, the permanganate is the major and the inert material is the minor portion, i. e. less than one-half, of the mixture. Best results are obtained with a mixture of barium permanganate with approximately 10% by weight of graphite.

The permanganate-graphite mixture is generally used in the form of compressed pellets but can also be applied as a coating on sand-blasted Inconel by using a 7% solution of styrene in xylene as a binder and baking dry. It can then be punched into discs which allow a smaller space factor. In addition to Inconel, other materials can be used as the base, such as, dependent on the application, aluminum, silver, nickel, chromium, molybdenum, graphite or silicon.

While the ionically conductive solid sulfates and the positive electrodes of permanganate-graphite mixture provide practically satisfactory potential producing cells with any one of the negative electrode materials disclosed in my above-mentioned co-pending applications, for most uses I employ certain nickel alloys, depending on the use, the preferred negative material being Inconel, which is a nickel-chromium alloy containing minor percentages of copper, silicon, manganese and carbon. Of the solid conductive sulfates, tin sulfate is the most satisfactory due to the fact that it is the least hygroscopic of the group disclosed and does not require an atmosphere controlled to the extent as is necessary when using bismuth sulfate or antimony sulfate. Thus, in accordance with the principles of the invention, the preferred potential producing cell for general applications comprises a solid ionic conductor of tin sulfate, a positive electrode in the form of a compressed pellet of barium permanganate containing approximately 10% by weight of finely divided graphite, and a negative electrode of Inconel. This combination provides a potential of approximately 1.42 volts.

The barium permanganate-graphite, tin sulfate, Inconel cell can produce a current of several micro-amperes for various periods. However, the cell is more useful where higher potentials are required over long periods of time with low current drain, as, for example, the charging and maintaining of a charge on a capacitor.

The operation of these novel potential producing cells employing an ionically conductive sulfate as the electrolyte is quite diffeernt from the reactions that take place in conventional galvanic cells wherein the major portion of the voltage is generated at the negative or consumable electrode, such as zinc, cadmium, aluminum, or magnesium, which is used in combination with a positive or depolarizer electrode. This can be observed, for example, in the case of the zinc-potassium hydroxide-mercuric oxide cell, where the potential of the cell equals the sum of potential differences between the electrolyte and the respective electrodes, 1.317 volts for the zinc and 0.028 volt for the mercuric oxide, in other words, a total of 1.345 volts. In contrast to this, in the cells of the invention, the major portion of the voltage is generated at the interface between the positive electrode and the ionically conductive solid electrolyte and a minor portion at the interface between the negative electrode and the said electrolyte. For example, in the preferred cell embodying the invention comprising a positive electrode of barium permanganate, a negative electrode of Inconel, and an interposed solid, ionically conducting electrolyte of tin sulfate, 1.08 volts are generated between the permanganate and the tin sulfate and 0.34 volt between the Inconel and the tin sulfate, a total of 1.42 volts.

The choice of negative electrode material is somewhat dependent upon the application for which the device is intended. For example, where negligible current is required, as in maintaining a potential across a capacitor and where wide ambient temperature variations, such as −60° to +160° F., are encountered, stainless steel, such as 18–8, will maintain the most stable voltage. Where some small current is required and higher ambient temperatures are encountered, a negative electrode of Inconel has shown the best results. Where still higher currents are required and a somewhat lower voltage per couple is not objectionable, molybdenum is the preferred negative electrode material. Generally speaking, molybdenum appears to be especially useful as a negative electrode material in the cells and batteries of the invention. If the current drawn is excessive, polarization occurs and the voltage drops but recuperates again to its original value upon removal of the load.

The potential of the cells of the invention varies with the negative electrode material and increases in the order of graphite, molybdenum, silver, copper, lead, nickel-chromium alloys, stainless steel, Monel, nickel, iron, silicon, aluminum, tin, the base voltage, 1.08 volts, being that of the junction between the permanganate-graphite and the tin sulfate. The highest voltage, due to the additive voltage of the negative electrode material, does not necessarily produce the most stable junction under the conditions of long shelf life and high ambient temperatures so that the application is an important factor in the choice of materials. For example, aluminum provides a potential as high as 1.8 volts per junction, yet under high ambient temperature it increases in contact resistance at the junction with tin sulfate due to the formation of an oxide film. The potentials obtained with negative electrodes of graphite, molybdenum or silver add little to that of the sulfate-permanganate junction but the cells will hold their potential over long periods of time and under conditions which would adversely affect other cells. The change in potential as a result of temperature changes is also of a small magnitude between −60° and +160° F.

In a practical form of the invention, the electrodes and the ionically conducting solid electrolyte are provided in the form of small discs which are stacked up under pressure in the proper order in a tubular casing to constitute a battery comprising a plurality of serially connected cells. I have found that under certain conditions atmospheric moisture may be absorbed by the cells and may have an adverse effect on the cell characteristics. Therefore, it is essential that the cell casing be hermetically sealed, preferably after the casing has been evacuated to a relatively low pressure and thus any residual moisture has been removed. After evacuation, any space left in the casing is filled with a suitable insulating material, such as a liquefied microcrystalline wax, as this will be set forth more fully hereinafter. I have further discovered that the stack pressure is of considerable importance in obtaining batteries of uniform characteristics. Accordingly, after assembly but before evacuation, impregnation and sealing, it is desirable to introduce the battery into an alternating current bridge circuit and to determine its internal resistance. Thereupon the compression applied to the stack is increased until the internal resistance drops to between 200 and 300 ohms per cell. A capacitor may be serially connected with the battery in order to eliminate the effect of any direct current component in the alternating current employed for carrying out the resistance measurement. In general, after vacuum impregnation of the battery, the internal resistance of the battery will increase to between 1000 and 1200 ohms per cell.

Fig. 2 of the drawing illustrates a single cell assembly in which one side of the tin sulfate electrolyte 13 is in contact with the Inconel negative electrode 12. The positive electrode 14 comprises barium permanganate containing a minor amount of graphite.

Fig. 1 illustrates an assembly of the cells shown in Fig. 2 into a high voltage battery comprising a tubular casing 10 of insulating material. The cells are stacked in the tube in the order of Inconel, tin sulfate and barium permanganate, a sufficient number of cells being employed to provide the desired voltage. Dished top and bottom terminals 11 are force-fitted in the ends of tube 10 and define therewith an airtight enclosure for the cell. The terminals may be made of silver or nickel-plated brass or steel, Inconel, or the like, terminals of brass or Inconel being preferred where a non-magnetic assembly is desired. A small aperture 15 is provided in the center portion of tube 10 through which the assembled battery may be evacuated and impregnated with a liquefied insulating material, such as a suitable microcrystalline wax.

In a practical battery embodying the principles of the present invention, the outer casing was a tube 1⅞″ long, having an outer diameter of 0.375″ and an inner diameter of 0.255″, made of a suitable synthetic resin, such as Rexolite, which is a copolymer of styrene and butadiene. The terminals were drawn in cup shape from 0.015″ thick nickel-plated steel. Tabs made of similar material may be pre-welded to the outer surface of the terminals, if desired.

The solid tin sulfate electrolyte has been prepared by pressing 0.065 gram of chemically pure tin sulfate ($SnSO_4$) at a pressure of 1500 lbs. into a round pellet 0.023″ thick and 0.250″ in diameter, with a chamfer of 0.006″ on the edges. Dies made of any non-reactive material are suitable, such as dies made of stainless steel, molybdenum, molybdenum alloys, or Carboloy. The barium permanganate pellets were made by grinding and mixing chemically pure barium permanganate with 10% by weight of graphite until a finely comminuted and uniform mixture was obtained. 0.036 gram of the mix was pressed in dies of good tool steel at a pressure of approximately 1500 lbs. in a round pellet 0.016″ thick, 0.250″ in diameter and having a chamfer of 0.004″ on the edges. The negative electrode was an Inconel disc 0.250″ in diameter blanked from cleaned 0.005″ thick Inconel strip. The Inconel strip was half hard or harder in order to assure clean and flat blanking operation.

In assembling the battery, one of the terminals was pressed in one end of the tubular outer casing and the cell elements were dropped into the casing in the order of Inconel—tin sulfate—barium permanganate. This procedure was repeated until the desired stack height was reached and then the stack was finished with an Inconel disc and the top terminal was inserted.

It is of great importance to have adequate contact pressure on the assembled unit or stack. This was accomplished by connecting the battery at the time of pressing in the top terminal in a 1000 cycle impedance bridge, with a capacitor in series to avoid direct current load effects, and pressing down the top terminal until the internal resistance of the battery was reduced to a value between 200 and 300 ohms per cell.

The assembled unit was then placed in a hot vacuum pot over a liquefied body of microcrystalline wax in such a position that the tubular casing was horizontally located with the small aperture on top. With the pot and wax held at a temperature of 90° C., the pot was evacuated to a pressure of 20 mm., holding the unit over the wax for ten minutes and immersing it in the liquefied wax for two minutes. At the end of this cycle, the vacuum was released gradually and the unit was allowed to impregnate for two minutes before draining and wiping. In some cases a small quantity of a suitable cement was applied over the wax-filled aperture of the casing to further assure hermetic sealing.

Although the present invention has been disclosed in connection with a preferred embodiment thereof, variations and modifications may be resorted to by those skilled in the art without departing from the principles of the invention. I consider all of these variations and modifications to be within the true spirit and scope of the present invention, as disclosed in the foregoing description and defined by the appended claims.

I claim:

1. A potential producing dry cell having a solid non-aqueous electrolyte comprising a conductive sulfate selected from the group consisting of tin, antimony and bismuth sulfates, and cooperating electrodes in contact therewith, one of said electrodes essentially comprising a permanganate selected from the permanganates of barium, potassium and lithium.

2. A potential producing dry cell comprising a solid non-aqueous ionic conductor selected from the group consisting of tin sulfate, antimony sulfate and bismuth sulfate constituting the electrolyte of the cell, and cooperating electrodes in contact therewith, one of said electrodes being essentially composed of barium permanganate.

3. A potential producing cell comprising a solid non-aqueous ionic conductor of tin sulfate constituting the electrolyte of the cell, a contacting electrode of a nickel base alloy on one side thereof, and a contacting conductive depolarizer essentially composed of barium permanganate on the other side thereof.

4. A potential producing cell comprising a solid non-aqueous ionic conductor of a conductive sulfate constituting the electrolyte of the cell, a positive electrode selected from the group consisting of permanganates of barium, potassium and lithium on one side thereof, and a negative electrode of molybdenum on the other side thereof.

5. A potential producing dry cell comprising a solid non-aqueous ionic conductor selected from the group consisting of tin sulfate, antimony sulfate and bismuth sulfate constituting the electrolyte of the cell, and cooperating electrodes in contact therewith, one of said electrodes being essentially composed of lithium permanganate.

6. A voltaic couple composed of a positive electrode, a negative electrode selected from the group consisting of permanganates of barium, potassium and lithium and an electrolyte, the voltage of said couple being preponderantly generated at the interface of the positive electrode and the electrolyte, the negative electrode of said couple essentially comprising molybdenum.

7. A voltaic couple composed of a positive electrode comprising barium permanganate, a negative electrode comprising metal selected from the group consisting of nickel alloys, chromium, stainless steel and molybdenum, and an electrolyte comprising a sulfate selected from the group consisting of tin, bismuth and antimony sulfate.

8. A voltaic pile comprising an outer casing; a series of stacked voltaic couples under pressure in said casing; each of said couples having a positive electrode comprising barium permanganate, a negative electrode comprising metal selected from the group consisting of chromium, nickel alloys and molybdenum, and a solid electrolyte of tin sulfate between said electrodes; said casing being hermetically sealed.

9. A potential producing cell comprising a negative electrode essentially composed of molybdenum, a solid electrolyte selected from the group consisting of tin, bismuth and antimony sulfates, and a positive electrode.

References Cited in the file of this patent

UNITED STATES PATENTS

| | | |
|---|---|---|
| 368,608 | Peyrusson | Aug. 23, 1887 |
| 434,458 | Pepper | Aug. 19, 1890 |
| 566,231 | Schafer | Aug. 18, 1896 |
| 2,023,717 | Willimek | Dec. 10, 1935 |
| 2,631,180 | Robinson | Mar. 10, 1953 |
| 2,649,766 | Johnson | Aug. 25, 1953 |
| 2,707,199 | Ruben | Apr. 26, 1955 |